United States Patent
Kim

(10) Patent No.: US 12,366,272 B2
(45) Date of Patent: Jul. 22, 2025

(54) BRAKE FORCE MEASUREMENT DEVICE

(71) Applicant: HYUNDAI MOBIS CO., LTD., Seoul (KR)

(72) Inventor: Sung A Kim, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 700 days.

(21) Appl. No.: 17/751,058

(22) Filed: May 23, 2022

(65) Prior Publication Data

US 2022/0373044 A1     Nov. 24, 2022

(30) Foreign Application Priority Data

May 24, 2021   (KR) ........................ 10-2021-0066500

(51) Int. Cl.
| | | |
|---|---|---|
| *F16D 66/02* | (2006.01) | |
| *F16D 55/22* | (2006.01) | |
| *F16D 55/00* | (2006.01) | |
| *F16D 66/00* | (2006.01) | |

(52) U.S. Cl.
CPC ...... *F16D 55/22* (2013.01); *F16D 2055/0016* (2013.01); *F16D 2066/005* (2013.01)

(58) Field of Classification Search
CPC .. F16D 55/22; F16D 2066/005; F16D 66/021; F16D 65/092; B60T 13/74; B60T 17/22
See application file for complete search history.

(56) References Cited

U.S. PATENT DOCUMENTS

| | | | |
|---|---|---|---|
| 2015/0027817 A1* | 1/2015 | Baumgartner | .......... B60T 1/065 73/121 |
| 2017/0335912 A1* | 11/2017 | Koh | ...................... F16D 66/022 |
| 2019/0351889 A1* | 11/2019 | Serra | ........................ F16D 66/00 |
| 2022/0299082 A1* | 9/2022 | Camozzi | ................. B60T 1/065 |
| 2024/0376948 A1* | 11/2024 | Klug | ..................... F16D 66/021 |

FOREIGN PATENT DOCUMENTS

| | | | | |
|---|---|---|---|---|
| EP | 1124073 A2 * | 8/2001 | ............ B60T 13/741 |
| KR | 10-2010-0032995 A | 3/2010 | |

OTHER PUBLICATIONS

Machine translation of EP 1124073 (no date).*

* cited by examiner

*Primary Examiner* — Nicholas J Lane
(74) *Attorney, Agent, or Firm* — NovoTechIP International PLLC

(57) ABSTRACT

A brake force measurement device may include: a pad detection part configured to detect a condition of a pad installed on a caliper; a brake detection part mounted on the caliper, and configured to detect deformation of the caliper; a controller configured to transmit/receive signals to/from the pad detection part and the brake detection part, and measure a brake force and detect whether the pad is worn; a sensor transfer part configured to connect the pad detection part and the brake detection part, and transfer a detection signal of the pad detection part to the brake detection part; and a control transfer part configured to connect the brake detection part and the controller, and transfer the detection signal of the pad detection part and the detection signal of the brake detection part to the controller.

12 Claims, 7 Drawing Sheets

BRAKE FORCE MEASUREMENT DEVICE

CROSS-REFERENCE TO RELATED APPLICATIONS

This application claims the benefit of priority to Korean Patent Application No. 10-2021-0066500, filed on May 24, 2021, which is hereby incorporated by reference for all purposes as if set forth herein

BACKGROUND

1. Technical Field

Exemplary embodiments of the present disclosure relate to a brake force measurement device, and more particularly, to a brake force measurement device which is implemented as one integrated device, and can detect not only a brake force but also whether a pad needs to be replaced.

2. Discussion of Related Art

In general, a brake system refers to a brake device which is used to not only decelerate or stop a traveling vehicle, but also maintain a parking state.

Such a brake system typically uses a friction brake which performs a braking operation by converting kinetic energy into thermal energy through a frictional force, and discharging the thermal energy to the air. The friction brake performs the braking function while either side of a disk rotated with a wheel is pressed by a pad through hydraulic pressure.

A hydraulic brake is implemented according to a method of strongly pushing a pad toward a disk by using hydraulic pressure during braking, and thus inevitably has a complex configuration that includes a master cylinder operated through a booster for boosting a pedal operation force and configured to generate hydraulic pressure, a hydraulic line connected to a wheel cylinder, and various devices configured to control and assist the above-described components. Due to the complexity of the configuration and the reduction in reliability of braking performance by the use of the hydraulic pressure, the hydraulic brake has a limitation in strengthening the stability.

In order to solve such problems, a system has been recently developed, which generates a brake force through an operation of a motor. However, the system has difficulties in accurately measuring a brake force which is actually inputted, due to a power loss caused by friction which occurs when the motor is driven.

The brake system additionally includes a sensor configured to detect whether a pad is worn, in order to inform a user of whether the pad needs to be replaced. Therefore, various sensors need to be integrated in order to secure a space.

The related art of the present disclosure is disclosed in Korean Patent Application Laid-Open No. 2010-0032995 published on Mar. 29, 2010 and entitled "Brake Force Measurement Sensor Device of Electronic Wedge Brake System."

SUMMARY

Various embodiments are directed to a brake force measurement device which is implemented as one integrated device, and can detect not only a brake force but also whether a pad needs to be replaced.

In an embodiment, a brake force measurement device may include: a pad detection part configured to detect a condition of a pad installed on a caliper; a brake detection part mounted on the caliper, and configured to detect deformation of the caliper; a controller configured to transmit/receive signals to/from the pad detection part and the brake detection part, and measure a brake force and detect whether the pad is worn; a sensor transfer part configured to connect the pad detection part and the brake detection part, and transfer a detection signal of the pad detection part to the brake detection part; and a control transfer part configured to connect the brake detection part and the controller, and transfer the detection signal of the pad detection part and the detection signal of the brake detection part to the controller.

The pad detection part may include: a pad fixing part mounted on the pad; and a pad insertion part extended from the pad fixing part, and inserted into the pad.

The pad insertion part may be electrically connected to the controller, and disposed in the pad so as to be worn with the pad when the pad is worn, and the controller may detect whether the pad is worn, on a basis of a current value change by a wear of the pad insertion part.

The brake detection part may include: an outer housing part mounted outside the caliper, and deformable with the caliper; an inner housing part mounted in the outer housing part, and deformable by the outer housing part; and a deformation sensor part mounted in the inner housing part, and configured to detect deformation of the inner housing part.

The brake detection part may be mounted in the inner housing part, and may further include a noise reduction part connected to the sensor transfer part and the control transfer part and configured to reduce measurement noise.

The noise reduction part may reduce measurement noise in a wear value of the pad, measured by the pad detection part, and a deformation value of the caliper, measured by the brake detection part.

The outer housing part may be molded over the inner housing part.

The outer housing part may include: an outer body part configured to cover the inner housing part; an outer extension part extended from either end of the outer body part; and an outer coupling part configured to couple the outer extension part and the caliper.

The inner housing part may include: an inner frame having the deformation sensor part mounted therein, and coupled to the outer body part; and an inner cover assembled to the inner frame, and configured to cover the inner frame.

The sensor transfer part may have a connector for connection.

The sensor transfer part may include: a first sensor transfer part connected to the pad detection part; and a second sensor transfer part connected to the inner housing part. The first sensor transfer part may have a first connector, the second sensor transfer part may have a second connector, and the first connector and the second connector may be electrically connected to each other so as to transfer a signal.

The second sensor transfer part or the second connector may be formed as one body with the outer housing part.

In the brake force measurement device in accordance with the embodiment of the present disclosure, the controller may be electrically connected to the pad detection part and the brake detection part in order to simultaneously measure the brake force and detect whether the pad is worn. Thus, the installation space and the number of parts may be reduced, which makes it possible to reduce the manufacturing cost.

DETAILED DESCRIPTION

Hereinafter, a brake force measurement device will be described below with reference to the accompanying drawings through various exemplary embodiments. It should be noted that the drawings are not to precise scale and may be exaggerated in thickness of lines or sizes of components for descriptive convenience and clarity only. Furthermore, the terms as used herein are defined by taking functions of the invention into account and can be changed according to the custom or intention of users or operators. Therefore, definition of the terms should be made according to the overall disclosures set forth herein.

Figure 1:
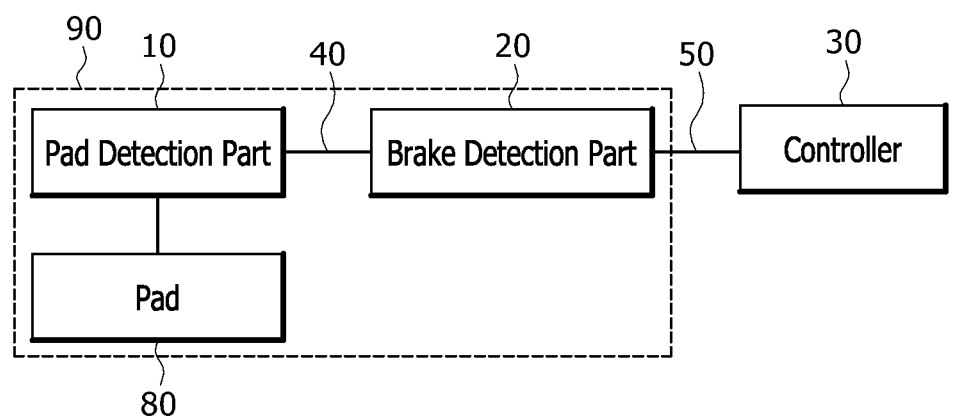
FIG. 1 is a diagram schematically illustrating a brake force measurement device in accordance with the embodiment of the present disclosure.

FIG. 1 is a diagram schematically illustrating a brake force measurement device 1 in accordance with an embodiment of the present disclosure. Referring to FIG. 1, the brake force measurement device 1 in accordance with the embodiment of the present disclosure includes a pad detection part 10, a brake detection part 20, a controller 30, a sensor transfer part 40, and a control transfer part 50.

The pad detection part 10 serves to detect the condition of a pad 80 included in a caliper 90. The pad detection part 10 may be coupled to or mounted on the pad 80, and serve to detect whether the pad 80 is worn.

The brake detection part 20 is coupled to or mounted on the caliper 90, and serves to detect deformation of the caliper 90. The brake detection part 20 may be coupled to or mounted on the outer surface of the caliper 90, and serve to detect the caliper 90 which is deformed during a disk pressing process.

The controller 30 serves to measure a brake force and detect whether the pad 80 is worn, by transmitting/receiving detection signals to/from the pad detection part 10 and the brake detection part 20.

The controller 30 may receive the detection signal of the pad detection part 10, and recognize whether the pad 80 is worn. The controller 30 may detect whether the pad 80 is worn, through the pad detection part 10, and simultaneously or separately measure a brake force through the brake detection part 20.

The sensor transfer part 40 is coupled between and connects the pad detection part 10 and the brake detection part 20, and transfers the detection signal of the pad detection part 10 to the brake detection part 20. Furthermore, the sensor transfer part 40 may transfer the detection signal of the brake detection part 20 to the pad detection part 10.

For example, the sensor transfer part 40 may be a cable having one end connected to the pad detection part 10 and the other end connected to the brake detection part 20.

The sensor transfer part 40 may be soldered to the pad detection part 10 and the brake detection part 20, or connected to the pad detection part 10 and the brake detection part 20 through a connector.

The control transfer part 50 connects the brake detection part 20 and the controller 30, and transfers the detection signal of the brake detection part 20 to the controller 30. Furthermore, the control transfer part 50 may transfer the detection signal of the pad detection part 10, transferred to the brake detection part 20 through the sensor transfer part 40, to the controller 30.

For example, the control transfer part 50 may be a cable having one end connected to the brake detection part 10 and the other end connected to the controller 30. The control transfer part 50 may be soldered to the brake detection part 20 and the controller 30, or connected to the brake detection part 20 and the controller 30 through a connector.

Figure 2:
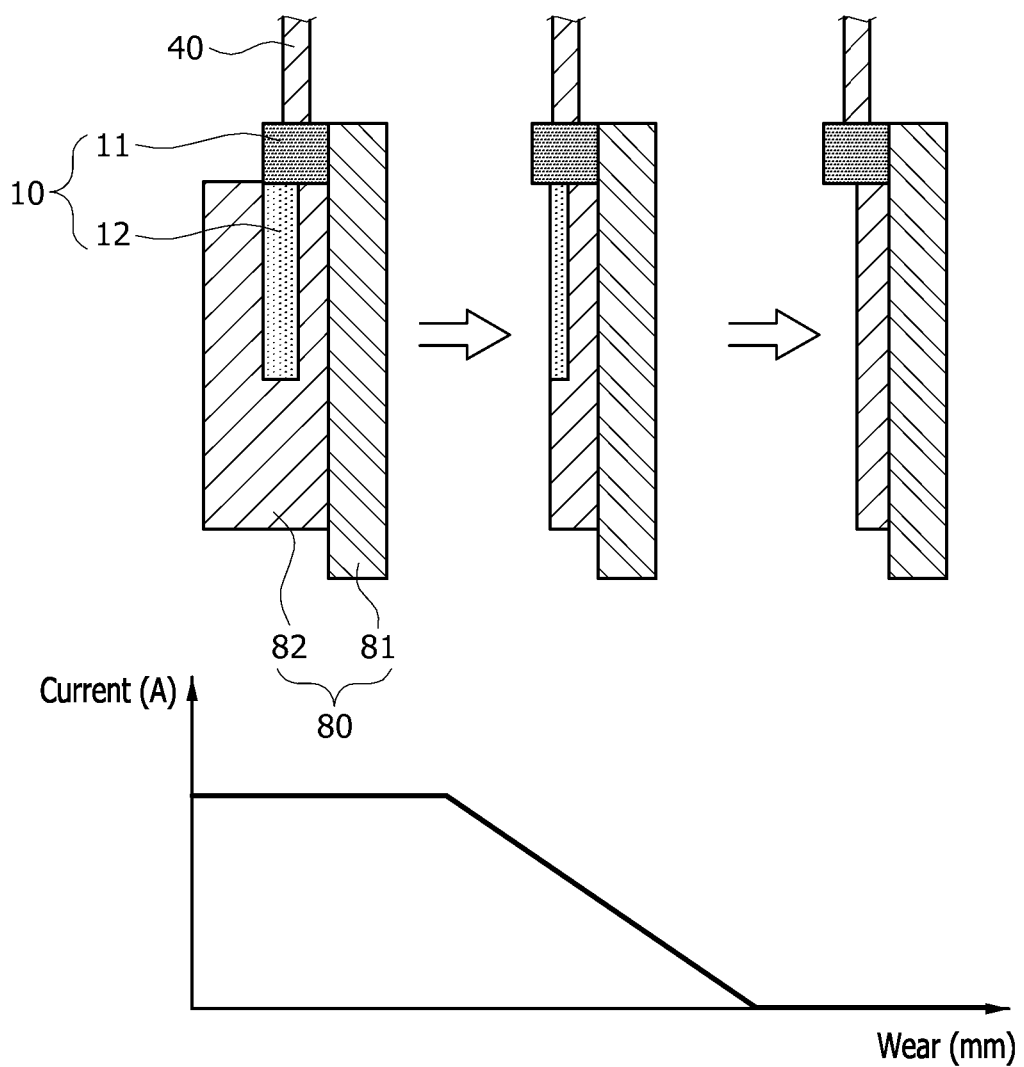
FIG. 2 is a diagram schematically illustrating a pad detection part in accordance with the embodiment of the present disclosure.

FIG. 2 is a diagram schematically illustrating the pad detection part in accordance with the embodiment of the present disclosure. Referring to FIG. 2, the pad detection part 10 in accordance with the embodiment of the present disclosure includes a pad fixing part 11 and a pad insertion part 12.

The pad fixing part 11 is coupled to or mounted on the caliper 90. For example, the pad fixing part 11 may be coupled to or mounted on the pad 80 which presses a disk while moved forward and backward.

The pad 80 may include a pad plate part 81 which is movable by a cylinder and a pad contact part 82 which is attached to the pad plate part 81 and generates a brake force through friction while coming into direct contact with the disk.

The pad fixing part 11 may be coupled to or mounted on the pad plate part 81, and maintain the state in which the pad fixing part 11 is electrically connected through the sensor transfer part 40. Thus, the pad detection part 10 and the sensor transfer part 40 are connected to each other.

The pad insertion part 12 is extended from the pad fixing part 11, and inserted and disposed in the pad 80. Therefore, the pad insertion part 12 wears along with the pad 80, when the pad 80 wears.

The pad insertion part 12 may be formed as one body with the pad contact part 82, and electrically connected to the controller 30 to measure a current value. When the pad insertion part 12 wears increasingly, the current value measured by the controller 30 decreases.

Therefore, a user may recognize how much the pad 80 is worn, through the current value measured by the controller 30. When the pad insertion part 12 is completely worn and removed, the current value measured by the controller 30 may become 0. When the current value measured by the controller 30 becomes 0, the controller 30 may turn on a warning light to inform the user that the pad 80 is worn.

Figure 3:
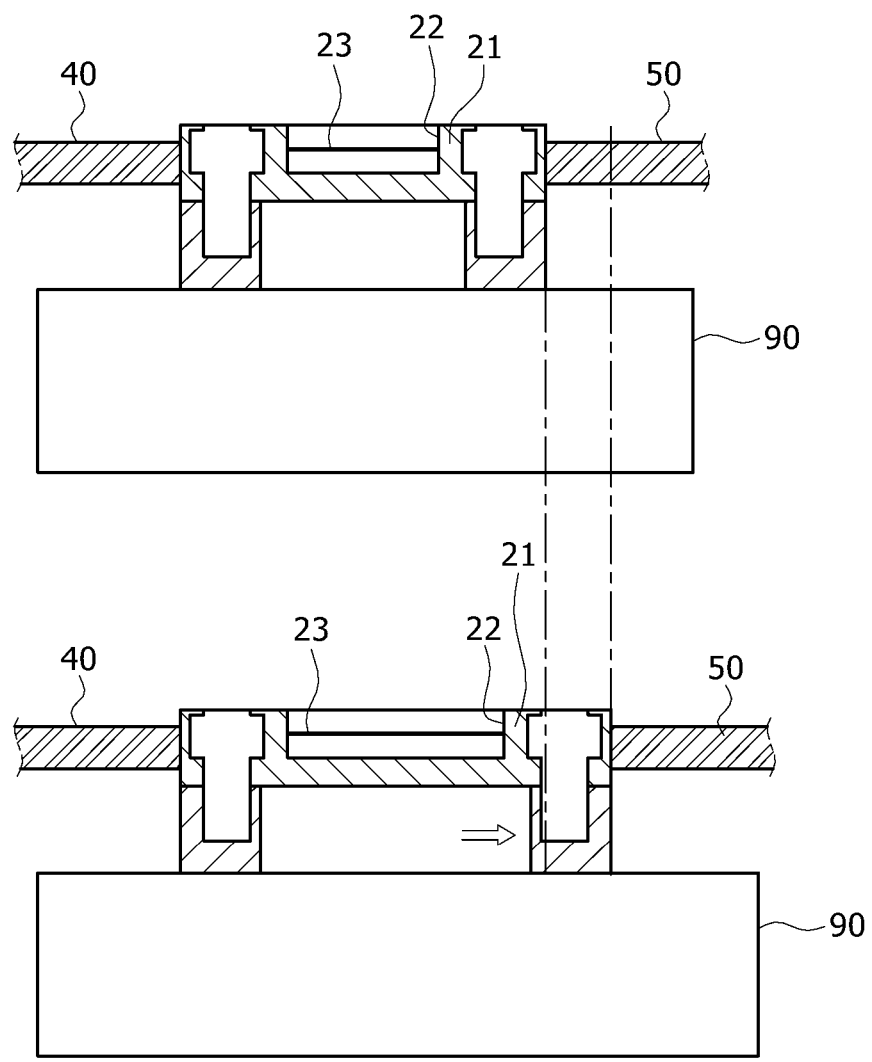
FIG. 3 is a diagram schematically illustrating a brake detection part in accordance with the embodiment of the present disclosure.
Figure 4:
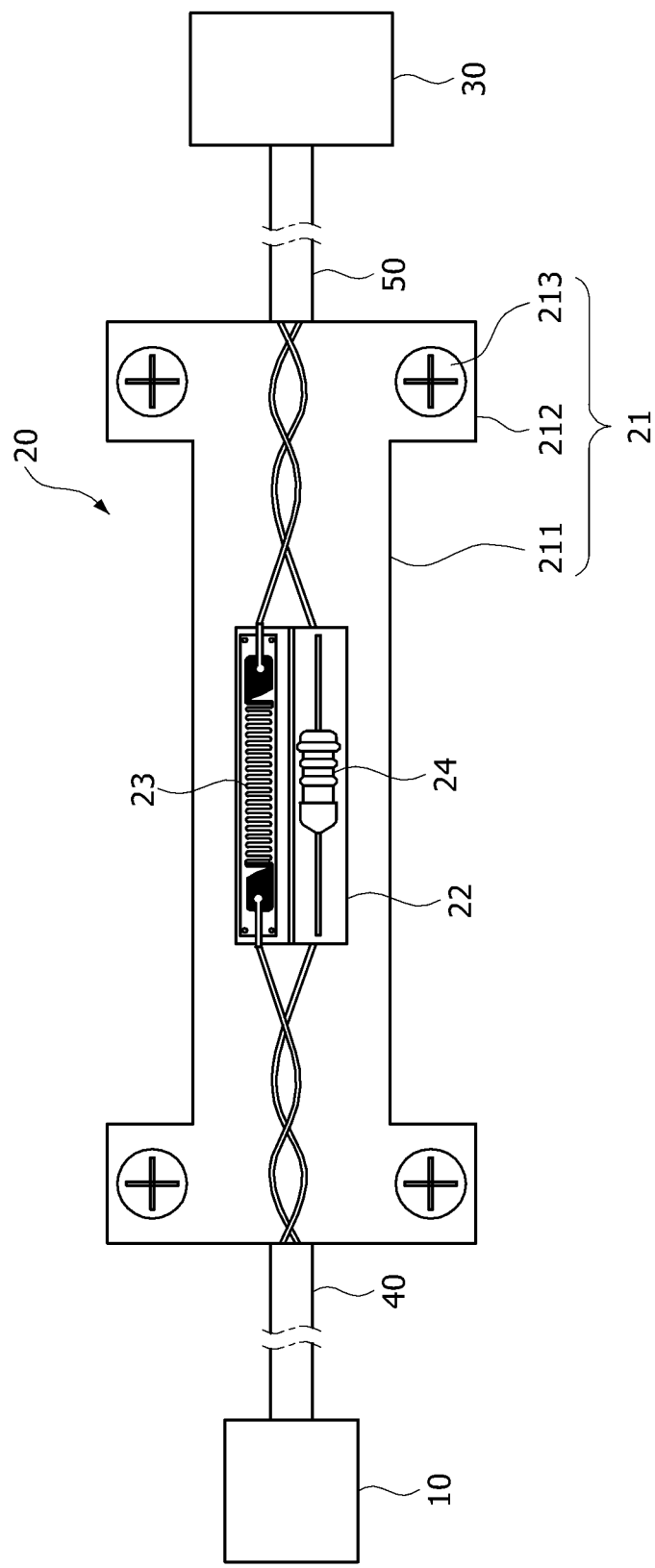
FIG. 4 is a diagram schematically illustrating an outer housing part in accordance with the embodiment of the present disclosure.
Figure 5:
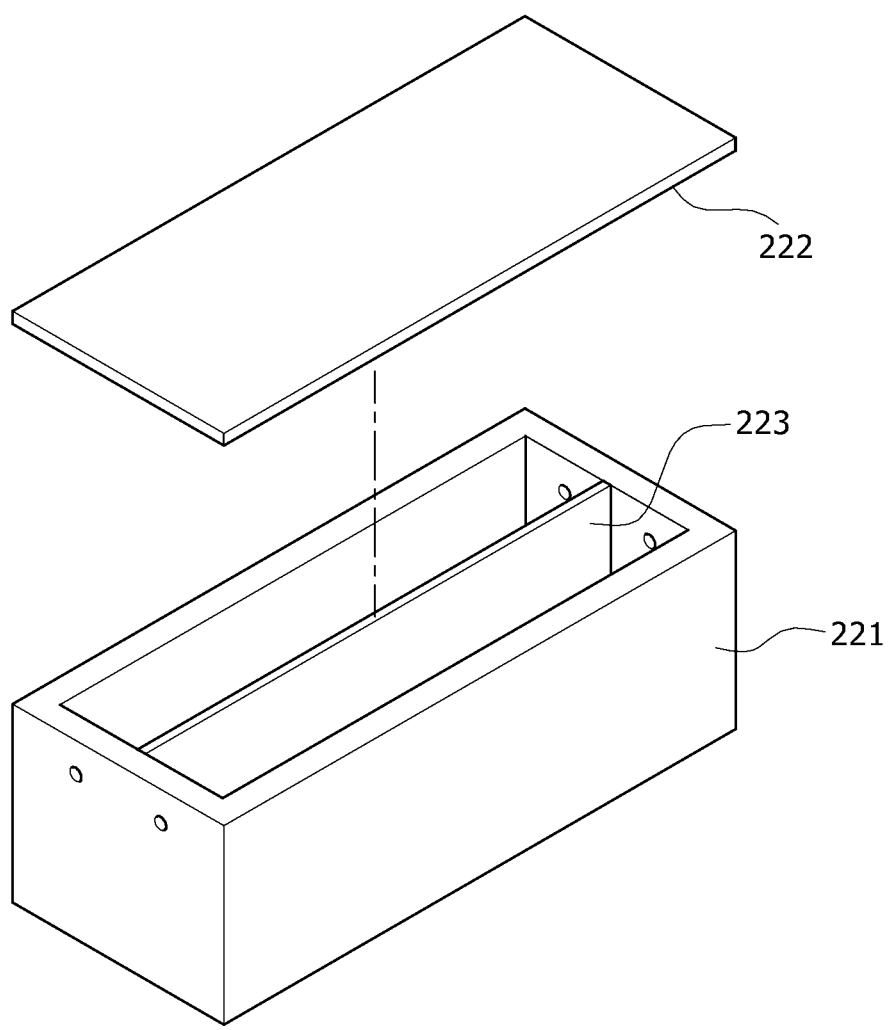
FIG. 5 is a diagram schematically illustrating an inner housing part in accordance with the embodiment of the present disclosure.

FIG. 3 is a diagram schematically illustrating the brake detection part in accordance with the embodiment of the present disclosure, FIG. 4 is a diagram schematically illustrating an outer housing part in accordance with the embodiment of the present disclosure, and FIG. 5 is a diagram schematically illustrating an inner housing part in accordance with the embodiment of the present disclosure.

Referring to FIGS. 3 to 5, the brake detection part 20 in accordance with the embodiment of the present disclosure includes an outer housing part 21, an inner housing part 22, and a deformation sensor part 23.

The outer housing part 21 is mounted outside the caliper 90. The outer housing part 21 may be coupled to or mounted on the outer surface of the caliper 90, and made of a material which can be deformed with the caliper 90 when the caliper 90 is deformed.

The inner housing part 22 may be mounted in the outer housing part 21. When the outer housing part 21 is deformed, the inner housing part 22 may also be deformed.

The inner housing part 22 may be made of the same material as the outer housing part 21. The outer housing part 21 and the inner housing part 22 may be assembled to each other or formed as one body. The inner housing part 22 may include terminals connected to the sensor transfer part 40 and the control transfer part 50, respectively.

The deformation sensor part 23 is mounted in the inner housing part 22, and senses the deformation of the inner housing part 22. For example, a strain gauge may be used as the deformation sensor part 23, and both ends of the deformation sensor part 23 may be connected to the respective terminals included in the inner housing part 22.

The brake detection part 20 in accordance with the embodiment of the present disclosure may further include a noise reduction part 24. The noise reduction part 24 is mounted in the inner housing part 22, and connected to the sensor transfer part 40 and the control transfer part 50 so as to reduce measurement noise.

The noise reduction part 24 may reduce measurement noise in a wear value of the pad 80, measured by the pad detection part 10, and a deformation value of the caliper 90, measured by the brake detection part 20.

The noise reduction part 24 may have both ends connected to the respective terminals of the inner housing part 22.

The outer housing part 21 is molded over the inner housing part 22. The deformation sensor part 23 and the noise reduction part 24 may be mounted in the inner housing part 22, and the outer housing part 21 may be molded over a portion of the inner housing part 22. In addition, when the outer housing part 21 is molded over the entire part of the inner housing part 22, the sensor transfer part 40 and the control transfer part 50 may be connected to the inner housing part 22, and then injection molding may be performed to mold the outer housing part 21 over the inner housing part 22.

The outer housing part 21 in accordance with the embodiment of the present disclosure includes an outer body part 211, an outer extension part 212, and an outer coupling part 213.

The outer body part 211 covers the inner housing part 22. For example, the outer body part 211 may be injection-molded as one body with all or part of the inner housing part 22 so as to be molded over the inner housing part 22.

The outer extension part 212 is extended from either end of the outer body part 211. The outer extension part 212 may be extended in a side-to-side direction from either end of the outer body part 211. The outer extension part 212 may be brought into close contact with the outside of the caliper 90, or seated on a boss protruding from the outside of the caliper 90.

The outer coupling part 213 couples the outer extension part 212 and the caliper 90 to each other. The outer coupling part 213 may be screwed to the caliper 90 while pressing the outer extension part 212.

The inner housing part 22 in accordance with the embodiment of the present disclosure may include an inner frame 221 and an inner cover 222. The inner frame 221 may be formed in a box shape whose bottom and side surfaces are connected to each other so that the top surface thereof is open. The inner cover 222 can be assembled to the inner frame 221, and covers the inner frame 221. The inner cover 222 may block foreign matters from flowing into the inner housing part 22, and open the inner frame 221 when the deformation sensor part 23 is replaced. Selectively, only the inner frame 221 may be mounted in the outer housing part 21 without the inner cover 222.

The inner frame 221 may have an inner barrier wall 223 to block the space between the deformation sensor part 23 and the noise reduction part 24. The inner barrier wall 223 may prevent shock caused by electrical connection between the deformation sensor part 23 and the noise reduction part 24. The inner frame 221 may have a hole through which a cable passes. In addition, the inner frame 221 may have terminals to induce the electrical connection.

Figure 6:
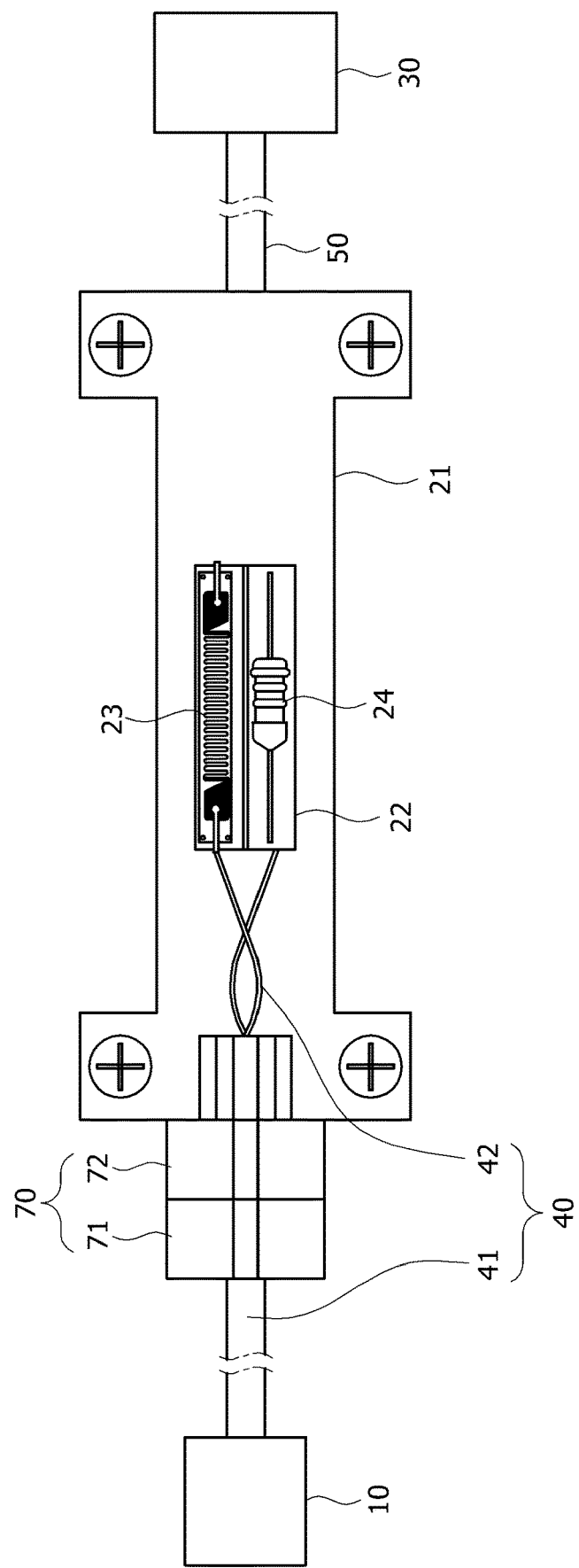
FIG. 6 is a diagram schematically illustrating a sensor transfer part in accordance with the embodiment of the present disclosure.

FIG. 6 is a diagram schematically illustrating the sensor transfer part in accordance with the embodiment of the present disclosure. Referring to FIG. 6, the sensor transfer part 40 in accordance with the embodiment of the present disclosure may include a connector 70 for connection. For example, the sensor transfer part 40 may include a first sensor transfer part 41 connected to the pad detection part 10 and a second sensor transfer part 42 connected to the inner housing part 22. The first sensor transfer part 41 has a first connector 71 provided at an end thereof, and the second sensor transfer part 42 has a second connector 72 provided at an end thereof. The first and second connectors 71 and 72 may be electrically connected to each other so as to transfer a signal. The second sensor transfer part 42 or the second connector 72 may be formed as one body with the outer housing part 21, or fixedly installed on the outer housing part 21. The second sensor transfer part 42 and the second connector 72 may be formed as one body with the outer housing part 21, or fixedly installed on the outer housing part 21.

An installation process of the brake force measurement device in accordance with the embodiment of the present disclosure having the aforementioned configuration will be described as follows.

The deformation sensor part 23 and the noise reduction part 24 are mounted in the inner housing part 22, and the sensor transfer part 40 and the control transfer part 50 are connected to the inner housing part 22. The outer housing part 21 is molded over the inner housing part 22, and installed outside the caliper 90. The sensor transfer part 40 connected to the inner housing part 22 is connected to the pad detection part 10, and the control transfer part 50 connected to the inner housing part 22 is connected to the controller 30.

Figure 7:
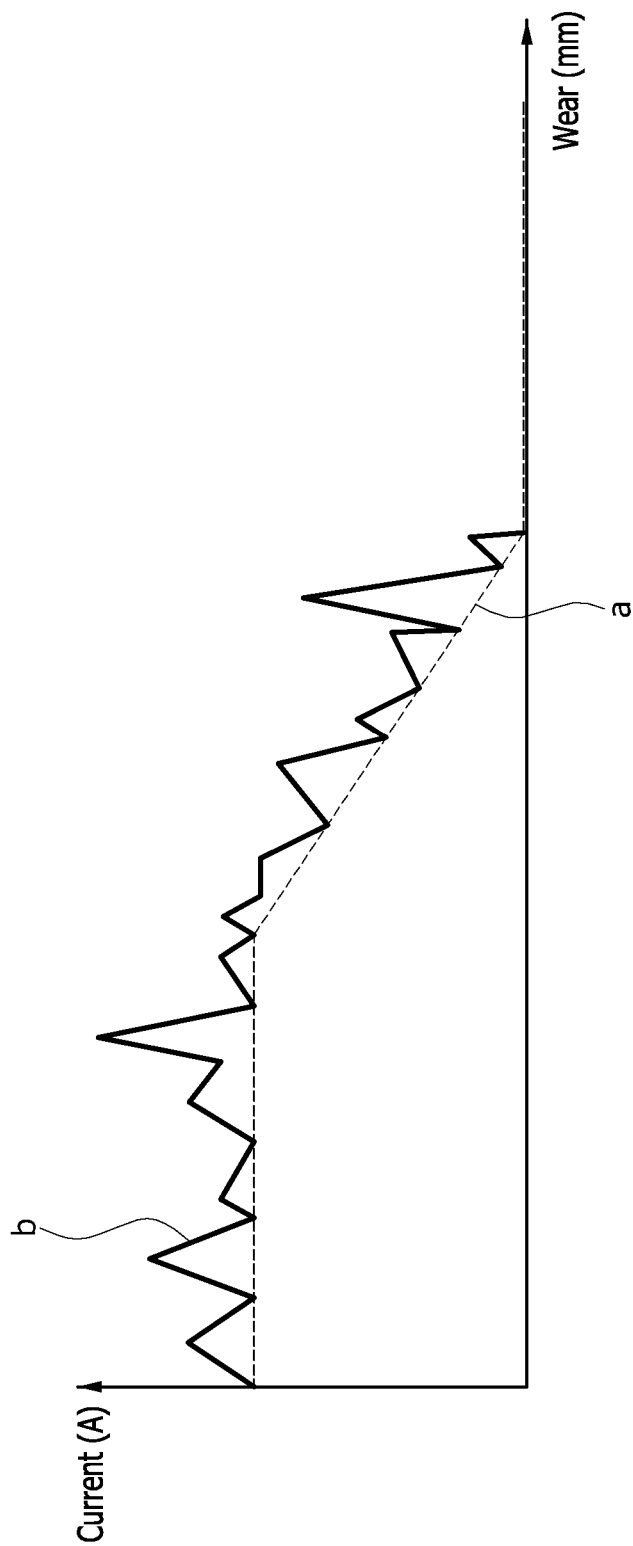
FIG. 7 is a graph schematically illustrating a measured signal received by a controller in accordance with the embodiment of the present disclosure.

In the above-described state, the controller 30 receives electrical signals of the pad detection part 10 and the deformation sensor part 23. FIG. 7 is a graph schematically illustrating a measured signal received by the controller in accordance with the embodiment of the present disclosure.

Referring to FIG. 7, the controller 30 may measure a current value (a) for the pad detection part 10. The controller 30 detects a preset current value when the pad contact part 82 is not worn. As the pad contact part 82 continuously wears, the controller 30 detects a current value which gradually decreases from the preset current value. When the entire pad contact part 82 is worn out, the current value measured by the controller 30 becomes 0. The controller 30 may detect the condition of the pad contact part 82 through the measured current value, and warn a user of the condition of the pad contact part 82, if necessary.

The controller 30 may measure a current value (b) of the deformation sensor part 23. That is, the outside of the caliper 90 is deformed during a braking process, and the outer housing part 21 and the inner housing part 22 are deformed so as to correspond to the deformation of the caliper 90. The deformation sensor part 23 may measure the deformation of the inner housing part 22 in real time, and the controller 30 may detect a brake force through the current value of the deformation sensor part 23.

In the brake force measurement device 1 in accordance with the embodiment of the present disclosure, the controller 30 may be electrically connected to the pad detection part 10 and the brake detection part 20 in order to simultaneously measure the brake force and detect whether the pad 80 is worn. Thus, the installation space and the number of parts may be reduced, which makes it possible to reduce the manufacturing cost.

Although exemplary embodiments of the disclosure have been disclosed for illustrative purposes, those skilled in the art will appreciate that various modifications, additions and substitutions are possible, without departing from the scope and spirit of the disclosure as defined in the accompanying claims. Thus, the true technical scope of the disclosure should be defined by the following claims.

What is claimed is:

1. A brake force measurement device comprising:
a pad detection part configured to detect a condition of a pad installed on a caliper and generate a first detection signal indicating the detected condition of the pad;
a brake detection part coupled to the caliper and configured to detect deformation of the caliper and generate a second detection signal indicating the detected deformation of the caliper;
a controller in communication with the pad detection part and the brake detection part and configured to measure a brake force and detect wear of the pad;
a sensor transfer part coupled between the pad detection part and the brake detection part and configured to transfer the first detection signal from the pad detection part to the brake detection part; and
a control transfer part coupled between the brake detection part and the controller and configured to transfer the first detection signal and the second detection signal from the brake detection part to the controller.

2. The brake force measurement device of claim 1, wherein the pad detection part comprises:
a pad fixing part coupled to the pad; and
a pad insertion part extending into the pad from the pad fixing part.

3. The brake force measurement device of claim 2, wherein:
the pad insertion part is electrically connected to the controller and configured to wear along with the pad and generate a wear signal indicative of a degree of wear of the pad insertion part, and
the controller is configured to detect a degree of wear of the pad based on the wear signal generated by the pad insertion part.

4. The brake force measurement device of claim 1, wherein the brake detection part comprises:
an outer housing part disposed outside the caliper and configured to deform along with the caliper;
an inner housing part disposed in the outer housing part and configured to deform along with the outer housing part; and
a deformation sensor part disposed in the inner housing part and configured to detect a degree of deformation of the inner housing part and generate, based on the detected degree of the deformation of the inner housing, a deformation signal indicative of a degree of deformation of the caliper.

5. The brake force measurement device of claim 4, wherein the brake detection part is disposed in the inner housing part, and further comprises a noise reduction part connected to the sensor transfer part and the control transfer part and configured to reduce a measurement noise in the first or second detection signal.

6. The brake force measurement device of claim 5, wherein the noise reduction part is configured to reduce the measurement noise in the wear signal or the deformation signal.

7. The brake force measurement device of claim 6, wherein the outer housing part has a portion over-molded to the inner housing part.

8. The brake force measurement device of claim 4, wherein the outer housing part comprises:
an outer body part covering the inner housing part;
an outer extension part extending from an end portion of the outer body part; and
an outer coupling part configured to couple the outer extension part and the caliper together.

9. The brake force measurement device of claim 8, wherein the inner housing part comprises:
an inner frame coupled to the outer body part and having a space at which the deformation sensor part is positioned; and
an inner cover coupled to the inner frame and covering the inner frame.

10. The brake force measurement device of claim 1, wherein the sensor transfer part comprises a connector.

11. The brake force measurement device of claim 10, wherein:
the connector comprises first and second connectors electrically coupled to each other, and
the sensor transfer part comprises:
a first sensor transfer part connected to the pad detection part and including the first connector; and
a second sensor transfer part connected to the inner housing part and including the second connector.

12. The brake force measurement device of claim 11, wherein the second sensor transfer part or the second connector is integral with the outer housing part.

* * * * *